G. S. CURTIS.
Wire-Band Cutter and Fruit-Picker.

No. 217,681.   Patented July 22, 1879.

Witnesses:
F. B. Townsend
F. E. Eelbrook

Inventor:
George S Curtis
per Jas. A. Cowles
Attorney

UNITED STATES PATENT OFFICE.

GEORGE S. CURTIS, OF CHICAGO, ILLINOIS.

IMPROVEMENT IN WIRE-BAND CUTTER AND FRUIT-PICKER.

Specification forming part of Letters Patent No. 217,681, dated July 22, 1879; application filed April 1, 1879.

*To all whom it may concern:*

Be it known that I, GEORGE S. CURTIS, of the city of Chicago, in the State of Illinois, have invented certain new and useful Improvements in Wire-Band Cutter and Fruit-Picker, which improvement is fully set forth in the following specification and the accompanying drawings.

Figure 1:
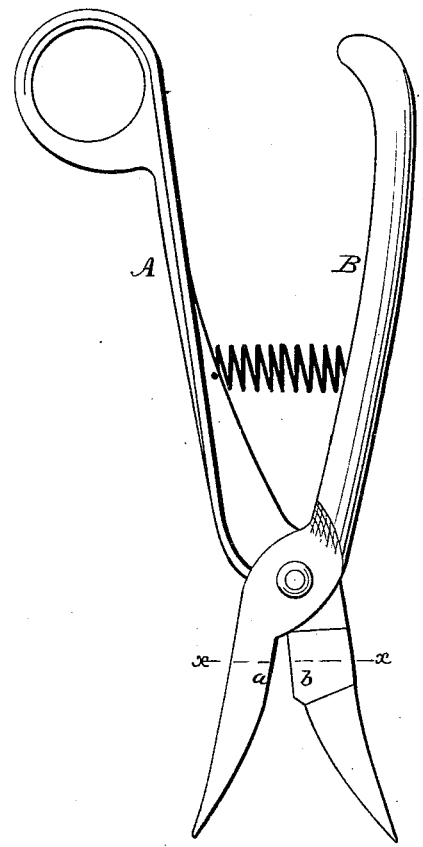
Figure 2:
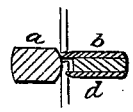

Figure 1 is a plan view, and Fig. 2 is a sectional view through the line $x\,x$ of Fig. 1.

The nature and object of my invention is to construct an implement for cutting the wire bands of grain, such as wheat, oats, &c., and also for picking all kinds of fruit that require handling with care, as hereinafter described.

In general appearance my improvement resembles an ordinary pair of tweezers with two arms, A and B, crossing each other. The longer ends of the arms serve as handles, with one handle terminating in a ring, as shown in the drawings.

Between the handles is a coiled spring to separate them when compressed. One side of the clamp, $a$, is smooth, against which the knife $b$ cuts. The knife $b$ is dovetailed into the clamp, to which it is attached. On the opposite side of the clamp to which the knife $b$ is attached there is attached, by being dovetailed, a second knife, $d$. This knife $d$ does not extend down as far as the knife $b$, as shown in Fig. 2. When the clamps are closed, the knife $b$ shuts against the surface $a$.

In using this implement for cutting wire bands, the hand clasps the two handles A B, with the index-finger in the ring, the two clamps are placed astride the wire band, the two handles A B are compressed, and the knife $b$ cuts the wire band apart, as seen in Fig. 2. At the same time the knife $d$ cuts into or clasps one end of the wire and holds it firmly between it and the smooth side of the clamp $a$, as shown in Fig. 2, while the other end of the wire is freely permitted to fly off, and the clamp, with the knife $d$ still holding the end, as before mentioned, is lifted from the now open bundle of grain, and carries with it the wire band. This insures the removal of the wire band from the bundle of grain after it is cut, and prevents it passing through the machine and mingling with the wheat to the injury of both.

The knife $d$, being sharp, the same as the knife $b$, cuts anything that comes between it and the smooth surface $a$ when the clamps are closed, except what occupies the space between it and the smooth surface $a$, caused by it not being so long as the knife $b$.

I am aware that implements for cutting wire and picking fruit have been made that cut the wire and hold the severed end—such, for instance, as Patent No. 201,006, dated March 5, 1878, and Patent No. 148,488, dated March 10, 1874; but in these patents no provision is made for cutting anything that comes between the surfaces of the jaws of the implement which hold the severed ends, which is necessary, as in the case of cutting the bands of bound wheat and other grain there would come between the jaws of the implement straws in connection with the wire band to such an amount that the jaws could not be forced together sufficiently near to permit the knife to do its duty in cutting the wire band.

In my improvement herein described, such could not be the case, as the second knife cuts everything before it, so far as it goes, while the other knife, working in advance of the second, goes clear down and cuts everything before it—wire, straw, and all—and when it has cut everything, the second knife has gone down sufficiently far to retain and hold the severed ends. The ends of the jaws are made to turn outwardly.

It is also used for picking grapes and any other fruit that requires to be carefully handled, as the knife $d$ holds the severed stem with the fruit, and it can be gently placed where desired. In picking fruit it should be held in the hand, the same as an ordinary pair of tweezers.

Having thus described my invention, what I claim is—

The wire-band cutter and fruit-picker described, one of its opposing jaws being an anvil-jaw, and the other having two cutting-edges, one (the severing-edge) in advance of the other, whereby the wire or stem is completely severed by the advanced edge, and is impressed or partly cut and held by the receded edge.

GEORGE S. CURTIS.

Witnesses:
HENRY CURTIS,
BENJ. F. O'CONNOR.